Jan. 12, 1926.                                                                1,569,178
C. M. FOSTER
FLUID PRESSURE INDICATOR
Filed March 27, 1925

Inventor
Cassius M. Foster,
By Owen Owen & Crampton,
Attorneys

Patented Jan. 12, 1926.

1,569,178

UNITED STATES PATENT OFFICE.

CASSIUS M. FOSTER, OF TOLEDO, OHIO.

FLUID-PRESSURE INDICATOR.

Application filed March 27, 1925. Serial No. 18,683.

*To all whom it may concern:*

Be it known that I, CASSIUS M. FOSTER, a citizen of the United States, and a resident of Toledo, in the county of Lucas and State of Ohio, have invented a new and useful Fluid-Pressure Indicator, which invention is fully set forth in the following specification.

This invention relates to means intended particularly for use in connection with internal combustion engines to determine the pressures in the cylinders thereof.

In the use of testing devices of this character, it has been customary, so far as I am aware, to either permanently connect a pressure gage to the several cylinders or a separate gage to each cylinder, or to have the connection between a gage and cylinder of such a nature as to render it impracticable to connect a gage with a cylinder while the engine is running, thus necessitating stopping the engine for each application of a gage to a cylinder. It is found in practice that in order to enable the pressures of different cylinders to be accurately taken, uniform running conditions for all of the cylinders should be present, which is practically impossible if the engine is stopped in making a change of the gage means from one cylinder to another, or if a cylinder during such change is permitted even momentarily to have free communication with the atmosphere through the connecting passage.

The object of the invention is the provision of means in connection with a pressure indicator of the character described, which will enable the indicator to be easily and quickly connected in fluid-tight manner with an engine cylinder, or disconnected therefrom without stopping the running of the engine and without opening communication between the cylinder being tested and the atmosphere, thereby permitting a constant running of the engine at any speed and a maintaining of uniform conditions during the testing of the several cylinders so that accurate pressure determinations may be made.

The invention is fully described in the following specification, and different embodiments thereof illustrated in the accompanying drawings, in which,—

Figure 1:
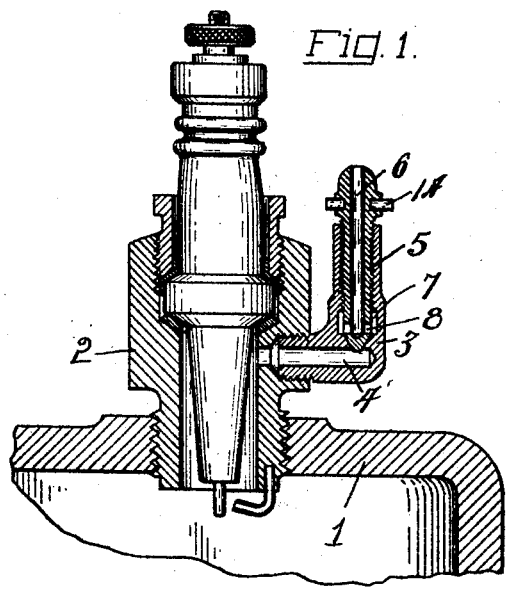
Figure 2:
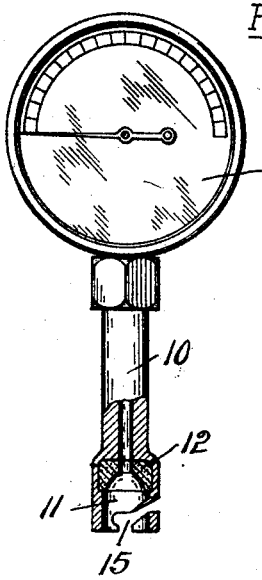
Figure 3:
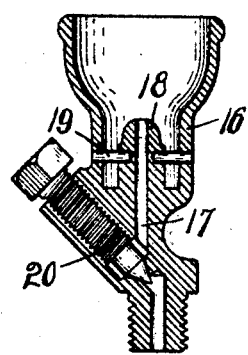
Figure 4:
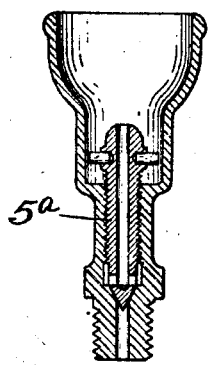
Figure 5:
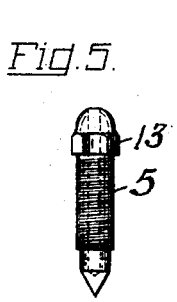
Figure 6:
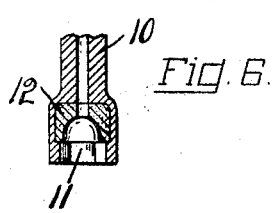

Figure 1 is a longitudinal sectional view of a spark plug with means associated therewith forming a valve control pressure testing passage in communication with the interior of the cylinder end of the spark plug shell. Fig. 2 is an elevation of the gage means employed, with a part broken away. Fig. 3 is a longitudinal section of an engine cylinder priming cock embodying one feature of the invention. Fig. 4 is a sectional view of another priming cock embodying the valve feature of the invention. Fig. 5 is an elevation of a slightly different form of valve embodying a feature of the invention, and Fig. 6 is a fragmentary sectional view of the valve engaging end of the pressure gage stem adapted for engagement with the valve of Fig. 5.

Referring to the drawings, 1 designates an engine cylinder, and 2 a spark plug threaded into an opening therein. A stem 3 is tapped into a side of the spark plug shell with its passage 4 in communication with the interior of the cylinder through the inner end portion of the shell. The stem 3, in the present instance, is of angular form and has the outer end portion of its passage enlarged to adapt a plug form of valve 5 to be threaded therein and to have its inner end seated against a restricted portion of the passage, as shown, to close the passage. The valve has a longitudinal passage 6 extending from its outer end to near its inner end and in communication with the portion 7 of the stem passage at a point above or without the valve seating through one or more lateral openings 8 in the valve. It is evident that when the valve is unseated, fluid will be permitted to escape from the cylinder through the passage 4 to the enlargement 7 thereof and thence through the valve passage to the atmosphere or to a pressure gage or other part seating on the outer end of the valve.

The pressure indicating means employed comprises a gage 9 having a hollow stem 10 with its passage in communication with the interior of the gage. The outer end of the stem passage is enlarged to form a socket 11 for receiving the outer end of the valve 5 and a cushion or gasket 12 to provide a close fluid-tight seating of the end of the valve within the socket when the desired seating pressure is brought to bear thereon. The gage stem and valve are also adapted to have interengaging connection in such manner that a turning of one will effect a turning of the other, so that when the gage stem has been closely seated on the valve so as to prevent any leakage of fluid therebetween, the gage may then be turned to effect an unseating movement of the valve. This places the interior of the gage in communication with the associated cylinder, so that the cylinder pressure can be determined. In Fig. 5 the outer end of the valve 5 is shown as provided slightly below its outer end with a nut or irregular portion 13, and in Fig. 6 the socket of the gage stem 10 is made of a shape complemental to the portion 13 of the valve so that a turning of one will effect a turning of the other.

With the manner of engagement of the gage stem and valve above described, it is sometimes difficult to hold the gage stem in fludid-tight seating engagement with the valve during a turning of the valve, and it is, therefore, preferable to provide means for insuring such close seating of the stem and valve during the valve turning movement. This is accomplished by making the stem socket 11 and the entering portion of the valve 5 of circular form in cross-section to permit one to turn within the other and providing one or more radial pins 14 on the valve for engagement within the respective angular slots 15 in the wall of the stem socket. The circumferentially extending portions of the slots 15 are tapered so that they have a wedging or camming action on the pins 14 when the gage stem is turned in a direction to unseat the valve, thereby forcing the outer end of the valve in close seating engagement with the gasket 12. It is evident that with this manner of engagement of the gage stem and valve the stem is retained closely seated on the valve during the gaging action and the opening and closing movements of the valve.

In Fig. 3 a priming cock 16 for an engine cylinder is shown as having its passage 17 extending out through a gage stem engaging nipple 18 formed in the bottom of the cup portion of the priming cock. This nipple is provided with pins 19 for the same purpose as the pins 14 of the valve 5, and the passage 17 is adapted to be closed by a valve 20 which may be manually opened after a seating of the gage stem on the nipple. Fig. 4 illustrates the same idea as Fig. 1, except that the valve member, which is indicated 5ª in this figure, is mounted in the passage of a priming cock instead of being connected with a spark plug.

In either of the forms shown in Figs. 1 and 4 priming may be effected, if desired, through the valve passage when the valve is unseated.

An important feature of my invention is that a tight seating of the gage stem with the means forming the outlet passage from an engine cylinder may be effected before an opening of the valve in such passage and maintained until the passage has again been closed, thereby obviating the necessity of stopping the engine each time the gage is placed in communication with a cylinder and enabling a gaging of all of the cylinders of an engine to be accurately taken under constant running uniform conditions. With the forms of the invention illustrated in Figs. 1, 2 and 4, the turning of the valve by the gage stem automatically effects and maintains a close fluid-tight seating of the stem on the valve while the valve is open.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. In combination, means forming a passage adapted to have communication with an engine cylinder, a valve mounted to seat in said passage to close the same and having an opening passage which communicates with the inner end of the first passage when the valve is unseated, and a fluid pressure gage means for detachable self holding engagement with the valve and operable to have close fluid-tight seating engagement with the valve and by the same action to effect an opening of the valve.

2. In combination, means forming a fluid passage, a valve mounted in said means rotatably movable to open and close said passage and having a fluid outlet passage through which fluid escapes from the first passage when the valve is open, and a fluid pressure gage means having a fluid inlet passage, said gage means and valve having parts which detachably interengage to form a fluid-tight seating thereof with said passages in communication and which cause a turning of the valve to open or close the first passage when the gage means is turned.

3. In combination, means forming a fluid passage, a valve rotatably mounted in said means to open or close said passage and having a longitudinal fluid outlet passage extending through its outer end for the escape of fluid from said first passage when the valve is unseated, a pin projecting radially from the outer end portion of the valve, a pressure gage means having a stem forming an inlet passage to the interior thereof, the outer end of which passage is enlarged to form a socket for receiving the outer end of the valve, a gasket in the socket against which the valve end seats, the wall of the socket having an angled slot therein for receiving the valve pin and effecting a tightening of the valve end against its seat within the socket and also acting to effect a turning of the valve with the stem of the gage means.

4. In combination, a nipple mounted for turning movements, a fluid pressure gauge having a stem projecting therefrom which has an inlet passage to the gauge, the outer end of the stem being fashioned and having its passage enlarged to form a socket adapted to seat over the nipple and co-act therewith to cause it to turn with the stem when turned, and a nipple seating gasket in the socket.

5. In combination, means forming a fluid passage, a nipple mounted for turning movements in said passage and adapted to open or close said passage when turned, and a fluid pressure gauge having an inlet passage to the gauge, the upper end of said passage being enlarged to form a nipple receiving socket to seat over the nipple, the wall of the socket being adapted to coact with the nipple to cause it to turn with the gauge.

6. In combination, means forming a passage adapted to have communication with an engine cylinder, a valve stem threaded in said passage and having a longitudinal opening therethrough and adapted when turned in one direction to seat in and close said passage and when turned in the other direction to place its opening and the passage in communication at opposite sides of the valve seat, and a pressure gauge having a part for seating on the outer end of the valve stem for detachable engagement therewith, said part and stem having interengaging portions both to hold the gauge part tightly seated on the valve stem and to cause the valve stem to turn therewith when the gauge is turned, said gauge part having a passage which opens communication between the valve stem opening and interior of the gauge when seated on the valve stem.

In testimony whereof I have hereunto signed my name to this specification.

CASSIUS M. FOSTER.